United States Patent [19]
Kashima et al.

[11] Patent Number: 5,462,791
[45] Date of Patent: Oct. 31, 1995

[54] FIBER-REINFORCED PLASTIC MATERIAL COMPRISING STACKED WOVEN FABRICS OF DIFFERENTIAL WEAVE IN A PLASTIC MATRIX

[75] Inventors: Toshihiro Kashima, Otsu; Masayuki Hoshino, Yokohama; Masachika Nakano, Yokohama; Tokushiro Hirano, Yokohama, all of Japan

[73] Assignees: Toyo Boseki Kabushiki Kaisha, Osaki; Toshiba Corporation, Tokyo, both of Japan

[21] Appl. No.: 227,571

[22] Filed: Apr. 14, 1994

Related U.S. Application Data

[63] Continuation of Ser. No. 833,764, Feb. 11, 1992, abandoned.

[30] Foreign Application Priority Data

Feb. 13, 1991 [JP] Japan .................... 3-020120

[51] Int. Cl.⁶ ............... B32B 7/00; D03D 15/00; D04B 1/00
[52] U.S. Cl. ............... 428/259; 428/257; 428/258; 428/302
[58] Field of Search ................ 428/36.1, 257, 428/258, 259, 245, 302

[56] References Cited

U.S. PATENT DOCUMENTS

| | | | |
|---|---|---|---|
| 3,486,966 | 12/1969 | Allen et al. | 428/911 |
| 4,372,347 | 2/1983 | Olsen | 428/258 |
| 4,407,885 | 10/1983 | Murphy et al. | 428/257 |
| 4,513,055 | 4/1985 | Leibowitz . | |
| 4,550,044 | 10/1985 | Rosenberg et al. | 428/911 |
| 4,800,113 | 1/1989 | O'Connor | 428/296 |
| 4,983,433 | 1/1991 | Shirasaki | 428/36.1 |

OTHER PUBLICATIONS

French Search Report.

*Primary Examiner*—James D. Withers
*Attorney, Agent, or Firm*—Foley & Lardner

[57] ABSTRACT

There are disclosed fiber-reinforced plastic materials with a composite structure including at least two kinds of fibers as reinforcing materials, which have reciprocal thermal expansion and contraction properties, and a synthetic resin as a matrix. The fiber-reinforced plastic materials of the present invention have the excellent advantages of exhibiting an extremely small degree of deformation caused by their thermal contraction, even when used under cryogenic circumstances.

8 Claims, 7 Drawing Sheets

FIBER-REINFORCED PLASTIC MATERIAL COMPRISING STACKED WOVEN FABRICS OF DIFFERENTIAL WEAVE IN A PLASTIC MATRIX

This application is a continuation of United States application Ser. No. 07/833,764 filed Feb. 11, 1992, now abandoned.

FIELD OF THE INVENTION

The present invention relates to fiber-reinforced plastic materials with excellent properties even at very low temperatures, and it also relates to various members produced from the same, which can be used under cryogenic circumstances.

BACKGROUND OF THE INVENTION

In recent years, various techniques have been developed at very low temperatures using liquefied gases, such as liquid helium or liquid nitrogen. For example, such techniques are used to prepare cryogenic conditions for medical applications, such as superconducting quantum interference device (SQUID), magnetic resonance imaging (MRI), and superconducting magnetic energy storage (SMES). Liquefied gases are also used in the transportation field, such as linear motor cars, as well as aeronautical and space applications.

For these applications, various materials have been proposed. For example, they are organic materials such as fiber-reinforced plastic materials, ceramics and metal materials (e.g., stainless steel, aluminum alloy). These materials are used for various cryostats, containers (e.g., Dewar's vessel), supporting materials and the like.

Cryostats are required to have non-magnetic properties, low electrical conductivity, vibration-damping properties, low thermal conductivity, low He-leaking properties and the like. Containers are required to have low He-leaking properties and the like. Supporting materials are required to have dimensional stability, low thermal conductivity and the like. In addition to these properties, mechanical properties such as workability are also required.

In satisfying these properties, fiber-reinforced plastic materials, particularly those containing glass fibers, i.e., glass fiber-reinforced plastic materials (GFRP), are excellent in electric and magnetic properties, mechanical properties and workability, and have been widely employed. The glass fiber-reinforced plastic materials are formed into various members, depending upon the applications thereof, such as tubes, bars, and plates.

Examples of these known members of glass fiber-reinforced plastic materials are illustrated by using the accompanying drawings.

FIGS. 10a and 10b show a tube-shaped member made of a conventional glass fiber-reinforced plastic material. The tube-shaped member is produced by winding glass fibers 1 in the form of a multilayer coil by the filament winding (FW) method and binding it with epoxy resin 2 as a matrix by setting. The use of an epoxy resin ensures that the glass fiber-reinforced plastic material will have a satisfactory strength, based on the strength of glass fibers, even at low temperatures. When a vinyl ester resin is used in place of an epoxy resin, the resin can also be set at room temperature.

FIGS. 11a and 11b show a bar-shaped member made of a conventional glass fiber-reinforced plastic material. The bar-shaped member is produced by pultrusion of glass fibers 1 using epoxy resin 2 as a matrix. In this case, the mechanical strength of the member can be improved by increasing the content of glass fibers and drawing it in a smaller diameter.

FIG. 12 shows a plate-shaped member made of a conventional glass fiber-reinforced plastic material. The member is produced as follows: glass fibers are woven into fabric 3, and a plurality of such fabrics are successively stacked, while being bound together with an epoxy resin, to form a plate-shaped member. In this case, the degree of contraction at low temperatures varies with a change in the weight ratio of glass fibers and epoxy resin, and it is, therefore, necessary to prepare a plate-shaped member at the predetermined weight ratio.

However, these known member of conventional fiber-reinforced materials have inferior dimensional stability. That is, glass fiber-reinforced plastic materials used for these members have a tendency to contract gradually with a decrease in temperature during the use. Even if the member is adequately positioned at room temperature, a problem is caused at low temperatures in that the member will shift its position because of the thermal contraction ocurring with a decrease in temperature.

For example, in the case of a tube-shaped member as shown in FIGS. 10a and 10b, even if the tube-shaped member is adequately positioned at room temperature, the member may contract both in the radial and axial directions at low temperatures, so that, when another member is provided on the periphery of the tube-shaped member, a gap may be formed therebetween, and when one end of the tube-shaped member is fixed, the member may move to the side of the fixed end.

Moreover, in cases where a bar-shaped member as shown in FIGS. 11a and 11b is used to support another member under fixed tensile, the axial contraction of the bar-shaped member may decrease the tensile with a decrease in temperature.

Further, in cases where a plate-shaped member as shown in FIG. 12 is inserted as a spacer between other members, even if the plate-shaped member satisfactorily serves as a spacer at room temperature, there may be formed a gap therebetween because the plate-shaped member contracts in the thickness direction with a decrease in temperature, so that the plate-shaped member cannot exhibit the function of serving as a spacer.

OBJECTS OF THE INVENTION

Under these circumstances, in order to solve the above problems, the present inventors have intensively studied fiber-reinforced plastic materials to improve their dimensional stability. As a result, it has been found that a combination of reinforcing fiber materials having reciprocal thermal expansion and contraction properties can prevent the undesired thermal contraction of fiber-reinforced plastic materials under cryogenic circumstances.

That is, the main object of the present invention is to provide fiber-reinforced plastic materials which exhibit an extremely small degree of deformation caused by their thermal contraction, even when used under cryogenic circumstances.

It is a further object of the present invention to provide various members in the shape of tubes, bars, plates, and the like, which can find many applications for use under cryogenic circumstances.

BRIEF DESCRIPTION OF THE DRAWINGS

FIG. 1b is an enlarged sectional view of the part "A" of FIG. 1a.

FIG. 4b is a front view of the bar-shaped member of FIG. 4a.

FIG. 10b is an enlarged sectional view of the part "A" of FIG. 10a.

FIG. 11b is a front view of the bar-shaped member of FIG. 11a.

SUMMARY OF THE INVENTION

Figure 1A:
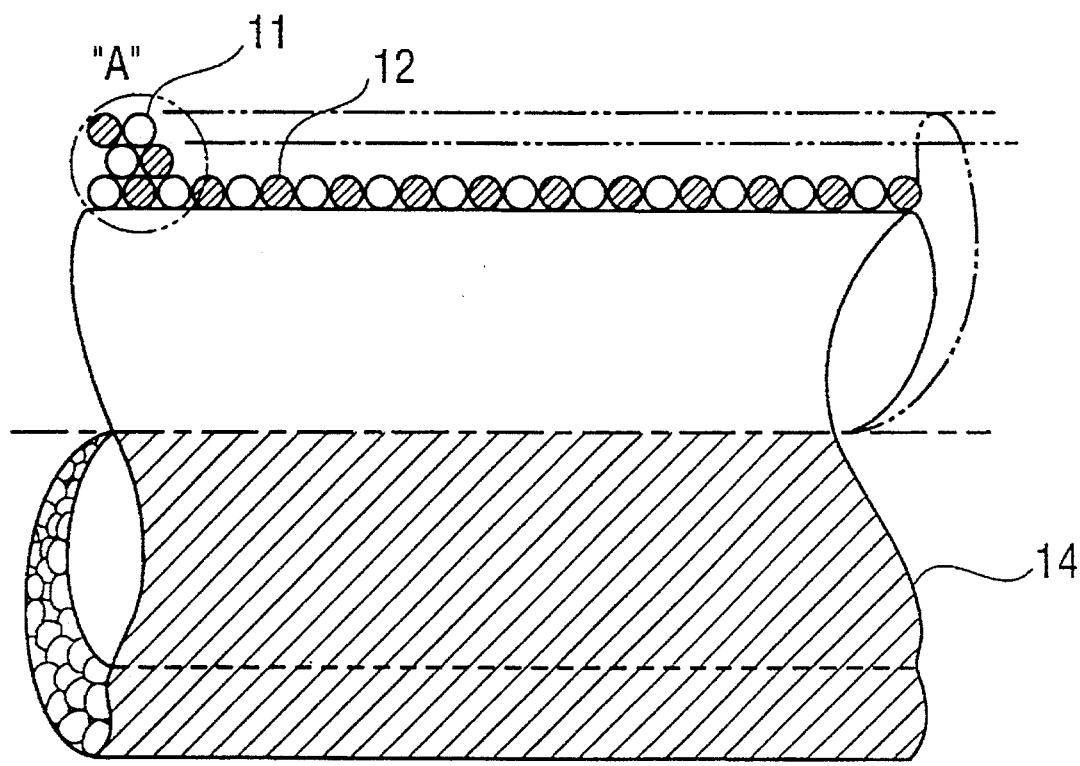
FIG. 1a is a schematic diagram showing the composite structure of a tube-shaped member made of the fiber-reinforced plastic material of the present invention.

According to the present invention, there is provided a fiber-reinforced plastic material with a composite structure comprising first and second fibers as reinforcing materials, which have reciprocal thermal expansion and contraction properties, i.e., positive and negative thermal expansion coefficients, respectively, and a synthetic resin as a matrix.

There are also provided various members in the shape of tubes, bars, plates, and the like, which are made of the above fiber-reinforced plastic material of the present invention.

DETAILED DESCRIPTION OF THE INVENTION

The present invention is based on the novel finding that an appropriate combination of at least two fiber materials having reciprocal thermal expansion and contraction properties can prevent the thermal contraction of fiber-reinforced plastic materials when used under cryogenic circumstances. In other words, both actions of fibers which contract with a decrease in temperature, i.e., which have positive thermal expansion coefficients, and of fibers which expand with a decrease in temperature, i.e., which have negative thermal expansion coefficients, are canceled with each other in the same resin matrix, so that the fiber-reinforced plastic material containing these fibers exhibits an extremely small degree of expansion and contraction, i.e., it has an extremely small apparent thermal expansion coefficient. Thus, improved dimensional stability can be obtained while maintaining other excellent properties of fiber-reinforced materials.

Examples of the fibers which contract with a decrease in temperature, i.e., which have positive thermal expansion coefficients, are those made of a material such as glass, alumina, silica, zirconia, silicon carbide, titania, aluminum, or steel, with glass fibers being most preferred. These fibers can be used alone or in combinations thereof.

Examples of the fibers which expand with a decrease in temperature, i.e., which have negative thermal expansion coefficients, are those made of a material such as polyethylene, aramide, polyarylate, polybenzobisoxazole, polybenzobisthiazole, polyethylene naphthalate, polyphenylene sulfide, polyamide-imide, polyether ether ketone, and polyethylene terephthalate, with polyethylene fibers being most preferred. These fibers can be used alone or in combinations thereof.

Examples of the synthetic resin which can be used as a matrix in the fiber-reinforced plastic material of the present invention include epoxy resins, unsaturated polyester resins, vinyl ester resins, urethane resins, and urethane acrylate resins, with epoxy resins being most preferred. These synthetic resins can be used alone or in combination thereof.

The fiber-reinforced material of the present invention can be produced by combining the fibers having negative and positive thermal expansion coefficients as illustrated in examples hereinafter, particularly, in such a manner that the ratio of longitudinal moduli between the fibers having negative and positive thermal expansion coefficients is substantially in reciprocal proportion to the ratio of degrees of expansion and contraction of both fibers, and then forming the fiber-reinforced material with the matrix according to a per se known method.

The fiber-reinforced material of the present invention can be used for cryostats, containers, supporting materials and the like according to the same manner as that of conventional fiber-reinforced materials.

As described above, the medical field, where fiber-reinforced plastic materials are applied to SQUID, MRI, etc., for example, cryostats are required to have non-magnetic properties, low electrical conductivity, vibration-damping properties, low thermal conductivity, low He-leaking properties, and the like. And, supporting materials for use under cryogenic circumstances are required to have dimensional stability, low thermal conductivity, and the like.

In general, metal materials, although excellent in mechanical properties, workability, and resistance to He leaking, are poor in dimensional stability, thermal conductivity, and non-magnetic properties. Therefore, in cases where metal materials are applied to, for example, SQUIDs, a problem may be caused that high signal-to-noise (S/N) ratios cannot be obtained. Further, as described above, glass fibers are also poor in dimensional stability, but they have low thermal conductivity, non-magnetic properties, and vibration-damping properties, as compared with metal materials. Organic fibers are excellent in dimensional stability, low thermal conductivity, non-magnetic properties, and lightweight properties. Among them, polyethylene fibers are particularly excellent in vibration-damping properties and dielectric properties. For these reasons, glass fibers are most preferred as those having positive thermal expansion coefficients, and polyethylene fibers are most preferred as those having negative thermal expansion coefficients.

PREFERRED EMBODIMENTS OF THE PRESENT INVENTION

The following Examples further illustrate the present invention in detail but are not to be construed to limit the scope thereof.

EXAMPLE 1

Figure 1B:
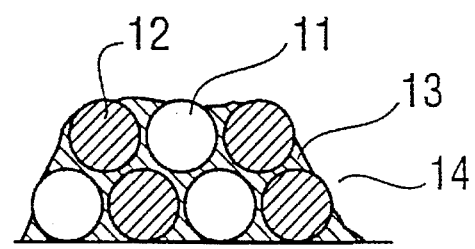

FIGS. 1a and 1b show a preferred example of a tube-shaped member made of the fiber-reinforced plastic material of the present invention, wherein the fiber-reinforced plastic material is composed of glass fibers and polyethylene fibers in a matrix of an epoxy resin. The tube-shaped member is produced, for example, as follows.

Glass fibers 11 and polyethylene fibers 12 in the same number are aligned in a manner that the respective kinds of fibers are alternately positioned, and they are wound in the form of a multilayer coil by the filament winding (FW) method, while being immersed in epoxy resin 13 as a matrix, resulting in a tube-shaped member 14.

Figure 2:
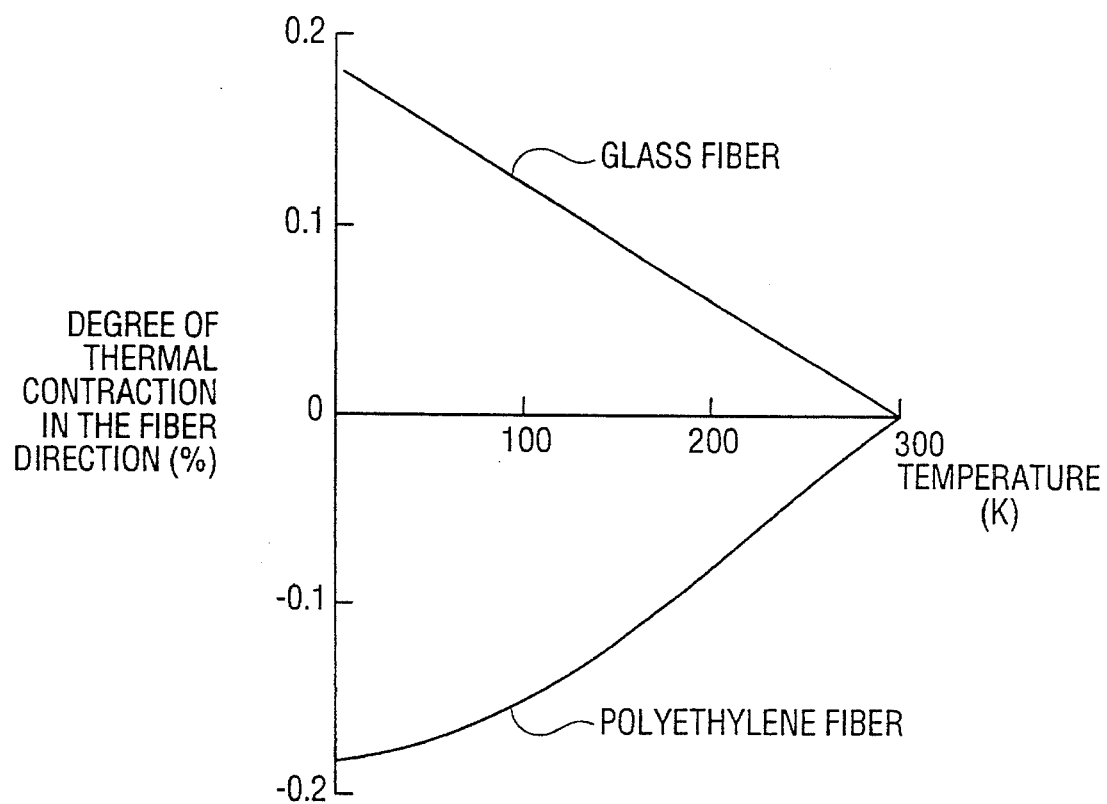
FIG. 2 is a graph showing the variations in the degree of thermal contraction in the fiber direction versus temperature change with respect to either glass fibers or polyethylene fibers, which are used in the present invention.

In this example, as described above, a combination of glass fibers and polyethylene fibers is used as reinforcing fiber materials. These fibers exhibit reciprocal contraction at low temperatures, as shown in FIG. 2. That is, these fibers have substantially the same absolute value of a thermal expansion coefficient, although the sign of the coefficient is opposite, i.e., they have reciprocal thermal expansion coefficients. In addition, the longitudinal moduli of these fibers are substantially the same. Therefore, the tube-shaped member of this example exhibits an extremely low degree of deformation when used under cryogenic circumstances.

A combination of fibers which have different absolute values of thermal expansion coefficients can also be used. For example, when the ratio of longitudinal moduli between the fibers are 2:1, these fibers should be selected so that ratio of degrees of expansion and contraction thereof is 1:2.

Figure 3:
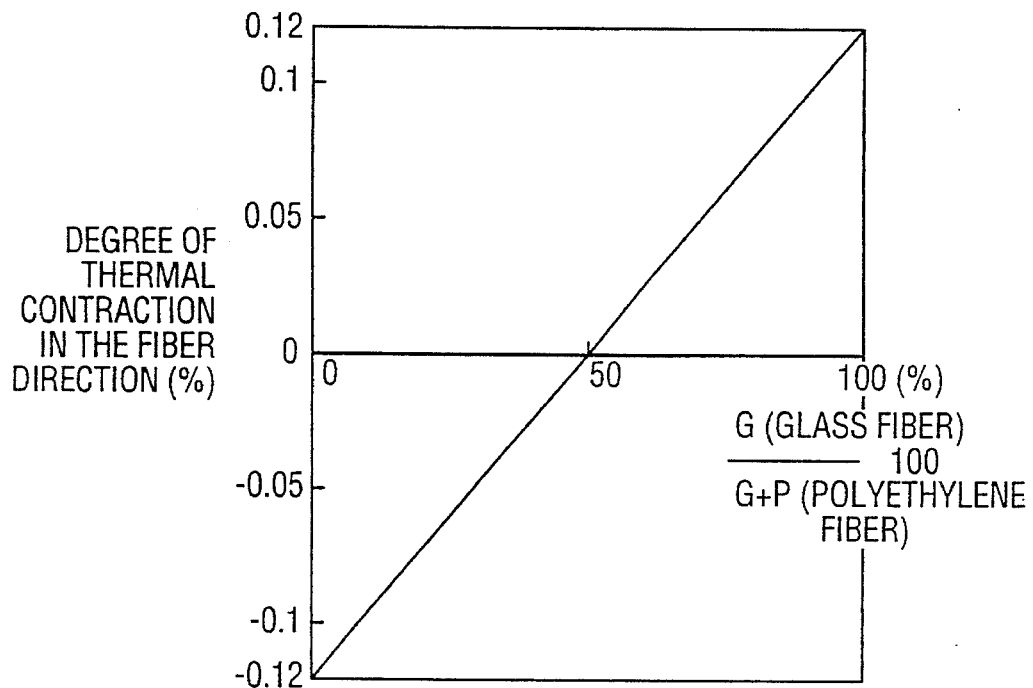
FIG. 3 is a graph showing the variation in the degree of apparent thermal contraction in the fiber direction versus blending ratio with respect to fiber-reinforced plastic materials containing glass fibers and polyethylene fibers.

Moreover, in cases where it is desired to change the degree of expansion and contraction for the fiber-reinforced plastic material while the longitudinal modulus thereof is the same as that of the fibers contained therein, it is possible to increase or decrease the degree of expansion or contraction by changing the mixing ratio of glass fibers and polyethylene fibers, as shown in FIG. 3. That is, the degree of contraction can be increased with an increase in the content of glass fibers, whereas the degree of expansion can be increased with an increase in the content of polyethylene fibers.

Further, in cases where two or more fibers are used, fibers can be combined in such a manner that the ratio of degrees of expansion and contraction is substantially in reciprocal proportion to that of longitudinal moduli of the fibers.

Thus, tube-shaped member 14 is made of the fiber-reinforced plastic material of the present invention with a composite structure including glass fibers 11 and polyethylene fibers 12 in the same number, which are alternately wound in the matrix of epoxy resin 13. With a decrease in temperature, glass fibers 11 have a tendency to contract, whereas polyethylene fibers 12 which are bound to glass fibers 11 with epoxy resin 13 as a matrix have an opposite tendency to expand. As described above, both fibers have substantially the same longitudinal modulus but have reciprocal thermal expansion coefficients, so that the expansion and contraction of these fibers are canceled with each other in the same composite material. Accordingly, even when tube-shaped member 14 is used under cryogenic circumstances, there is substantially no radial or axial contraction of the member, and the problems that a gap may be formed between tube-shaped member 14 and other members provided on the periphery thereof can be solved, and that, when tube-shaped member 14 is used in such a situation that one end of the member is fixed to another member, tube-shaped member 14 may shift its position toward the fixed end of the member.

When two or more fibers are used for each of the reinforcing fiber materials, such excellent advantages can also be attained; in this case, the expansion and contraction of fiber-reinforced plastic materials thus obtained can be controlled by changing the mixing ratio, e.g., weight ratio, of the reinforcing fiber materials, as shown in FIG. 3.

EXAMPLE 2

Figure 4A:
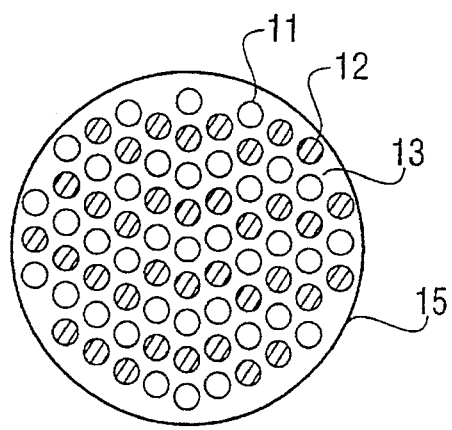
FIG. 4a is a sectional view showing the composite structure of a bar-shaped member made of the fiber-reinforced plastic material of the present invention.
Figure 4B:
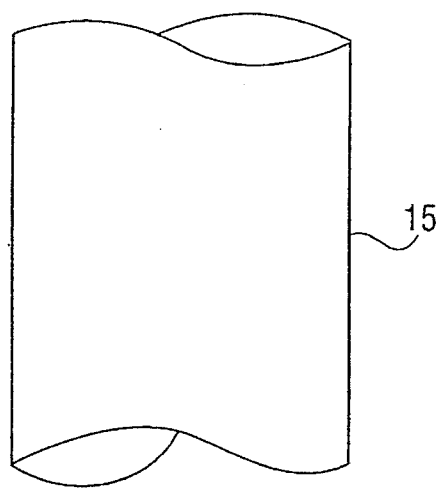

FIGS. 4a and 4b show a preferred example of a bar-shaped member made of a fiber-reinforced plastic material of the present invention, wherein the fiber-reinforced plastic material is composed of glass fibers and polyethylene fibers in a matrix of an epoxy resin. The bar-shaped member is produced, for example, as follows.

Appropriate numbers of glass fibers 11 and polyethylene fibers 12 in such a proportion that the sectional-area ratio (or roving number ratio) thereof becomes 1:1 are integrated with each other by pultrusion using an epoxy resin as a matrix, resulting in a bar-shaped member 15.

Also in this example, a combination of glass fibers and polyethylene fibers is used as reinforcing fiber materials, similarly to the case of Example 1. These fibers have reciprocal thermal expansion coefficients, so that they exhibit reciprocal axial contraction at low temperatures, as shown in FIG. 2. They have substantially the same longitudinal moduli. Therefore, the bar-shaped member of this example exhibits an extremely low degree of axial contraction when used under cryogenic circumstances.

The degree of axial expansion of bar-shaped member 15 can be controlled by changing the sectional-area ratio of glass fibers and polyethylene fibers, as shown in FIG. 3. That is, the degree of axial expansion can be increased with an increase in the sectional-area of polyethylene fibers, whereas the degree of axial contraction can be increased with an increase in the sectional-area of glass fibers.

Thus, bar-shaped member 15 is made of a fiber-reinforced plastic material of the present invention with a composite structure including glass fibers 11 and polyethylene fibers 12 in such a proportion that the sectional-area ratio (or roving number ratio) thereof becomes 1:1, which fibers are integrated with each other in the matrix of epoxy resin 13. With a decrease in temperature, glass fibers 11 have a tendency to contract, whereas polyethylene fibers 12 which are bound to glass fibers 11 with epoxy resin 13 as a matrix have an opposite tendency to expand. As described above, both fibers have substantially the same longitudinal modulus but have reciprocal thermal expansion coefficients, so that the expansion and contraction of these fibers are canceled with each other in the same composite material. Accordingly, even when bar-shaped member 15 is used under cryogenic circumstances, there is substantially no axial contraction of the member, and the problem can be solved that, even if the bar-shaped member is used to support another member under fixed tensile at room temperature, the tensile may be decreased by the axial contraction of the member with a decreased in the temperature.

If the degree of axial expansion is controlled, it is possible to obtain bar-shaped members which exhibit a suitable degree of axial expansion for their intended use by changing the sectional ratio of glass fibers and polyethylene fibers.

EXAMPLE 3

Figure 5:
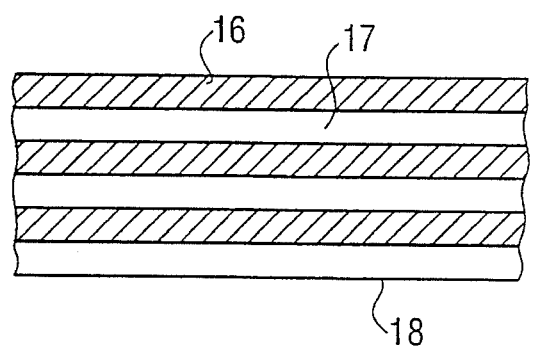
FIG. 5 is a sectional view showing the composite structure of a plate-shaped member made of the fiber-reinforced plastic material of the present invention.

FIG. 5 shows a preferred example of a plate-shaped member made of a fiber-reinforced plastic material of the present invention, wherein the member is a laminate of fabrics composed of glass fibers and/or polyethylene fibers with an epoxy resin as a binder. The plate-shaped member is produced, for example, as follows.

Figure 6:
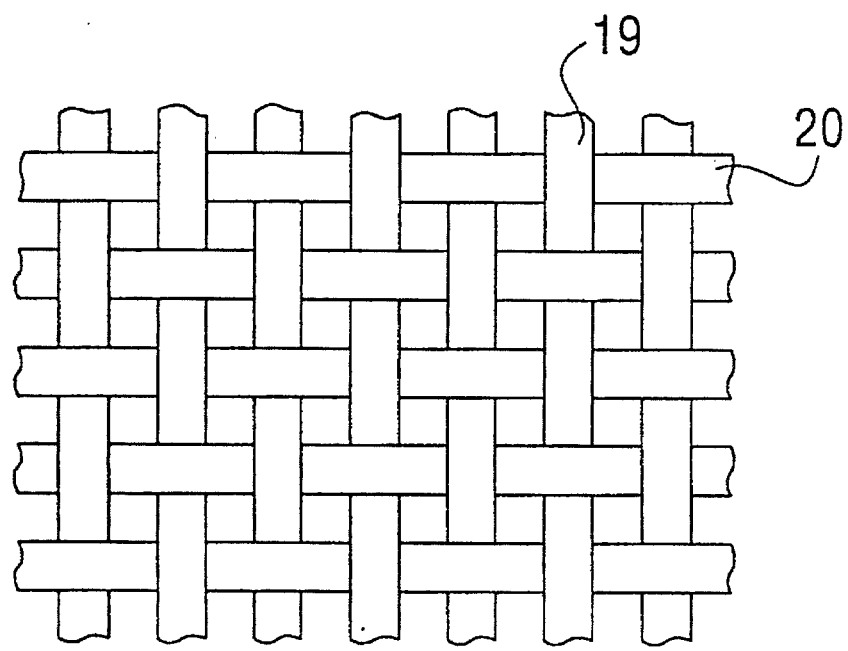
FIGS. 6–9 are enlarged views showing the structures of various woven fabrics used for making the plate-shaped member of FIG. 5.

First, glass fibers which contract at low temperatures and polyethylene fibers which expand at low temperatures are woven into fabrics 16 and 17, respectively. Then, the respective fabrics in the same number are alternately stacked one after another, while the adjacent fabrics are bound with an epoxy resin, resulting in a plate-shaped member 18. The respective fabrics 16 and 17 have a structure as shown in FIG. 6, where warps 19 and wefts 20 correspond to glass fibers (in fabrics 16) or polyethylene fibers (in fabrics 17).

Thus, plate-shaped member 18 is a laminate of fabrics 16 and 17 which are composed of glass fibers and polyethylene fibers, respectively, and integrated with each other using an epoxy resin as a binder. With a decrease in temperature, fabrics 17 composed only of polyethylene fibers have a tendency to expand, whereas fabrics 16 composed only of grass fibers have an opposite tendency to contract. Both fabrics have substantially the same modulus of elasticity, so that the degrees of expansion and contraction of the member is decreased by setting the volume ratio of these fabrics to 1:1. To the contrary, the degrees of expansion and contraction of the member can be varied by changing the volume ratio of these fabrics.

Figure 7:
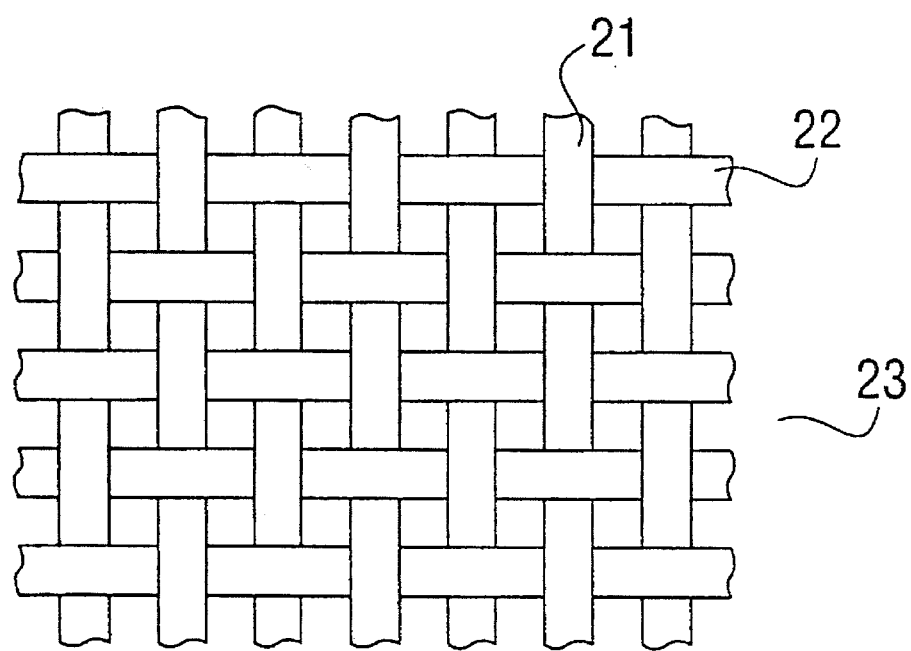

In the above example, each fabric is composed of warps 19 and wefts 20, both of which are made of the same material. As shown in FIG. 7, warps 21 made of glass fibers and wefts 22 made of polyethylene fibers may also be used to prepare fabric 23, and such fabrics are then stacked to form a plate-shaped member in such a manner that adjacent fabrics are at right angles around the thickness direction.

Figure 8:
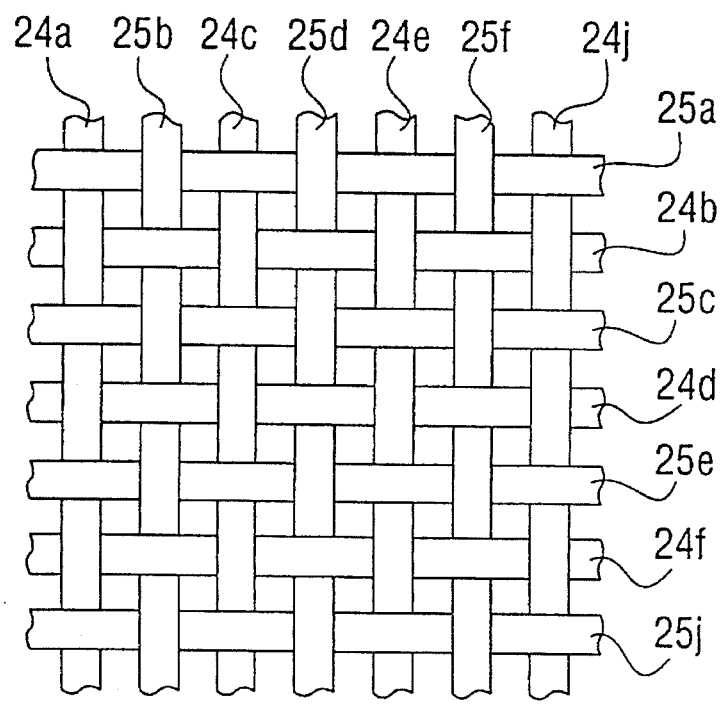

Alternatively, each fabric may be composed of at least two kinds of warps and at least two kinds of wefts. For example, as shown in FIG. 8, warps 24a, 24c, 24e, 24j, and wefts 24b, 24d, 24f may be made of polyethylene fibers, whereas warps 25b, 25d, 25f, and wefts 25a, 25c, 25e, 25j may be made of glass fibers. A plurality of such fabrics are then stacked one after another to form a plate-shaped member.

Figure 9:
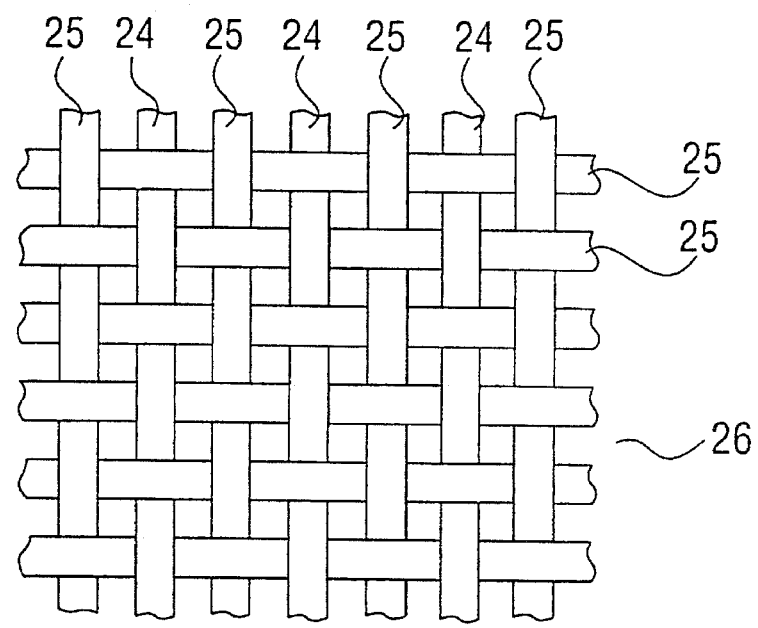
Figure 10A:
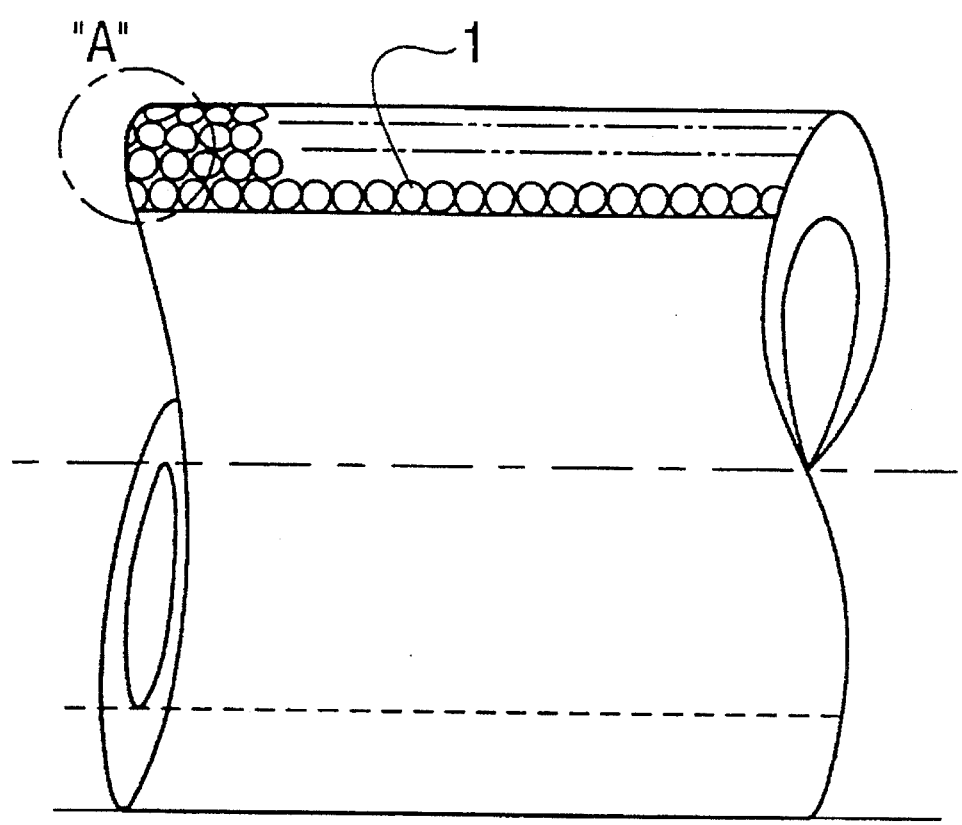
FIG. 10a is a schematic diagram showing the composite structure of a tube-shaped member made of a conventional fiber-reinforced plastic material.
Figure 10B:
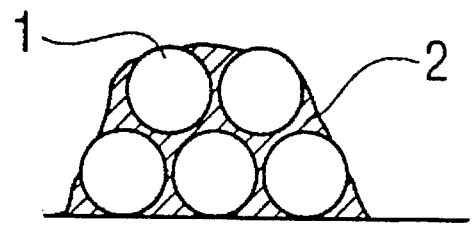
Figure 11A:
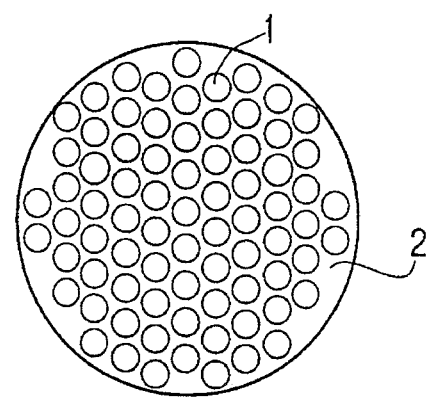
FIG. 11a is a sectional view showing the composite structure of a bar-shaped member made of a conventional fiber-reinforced plastic material.
Figure 11B:
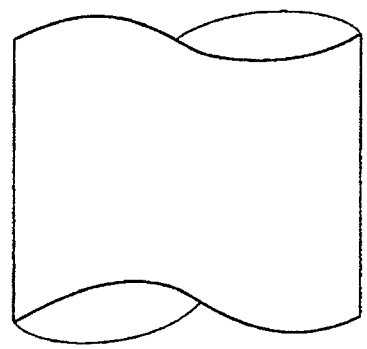
Figure 12:
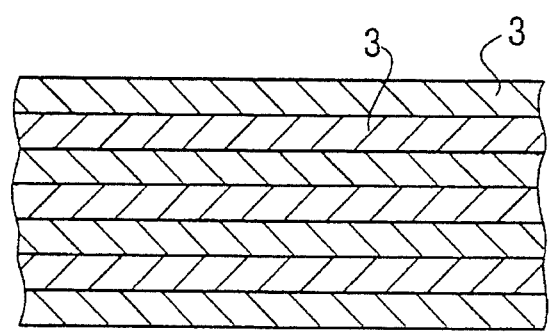
FIG. 12 is a sectional view showing the composite structure of a plate-shaped member made of a conventional fiber-reinforced plastic material.

Further, for example, in fabric 26 as shown in FIG. 9, warps may be composed alternately of glass fibers 25 and polyethylene fibers 24, whereas wefts may be composed only of glass fibers 25. A plurality of such fabrics are then stacked one after another to form a plate-shaped member in such a manner that adjacent fabrics are at right angles around the thickness direction.

These examples shown in FIGS. 7 to 9 have a composite structure which makes it possible to obtain plate-shaped members having the thermal expansion and contraction properties with no anisotropy and exhibiting extremely small expansion and contraction at low temperatures. Therefore, even when these members are used as a spacer between other members, a gap cannot be formed therebetween by contraction of the spacer in the thickness direction at low temperatures. Moreover, fiber-reinforced plastic materials made of polyethylene fibers and glass fibers can be used to produce either expandable members or contractible members, depending upon the applications thereof, by a change in the volume ratio of both fibers because polyethylene fibers have substantially the same longitudinal modulus as that of glass fibers.

As described above, according to the present invention, it is possible to provide fiber-reinforced plastic materials which exhibit an extremely small degree of deformation caused by their thermal contraction, even when used under cryogenic circumstances because the fiber-reinforced plastic materials have a composite structure containing at least two kinds of fibers which have reciprocal thermal expansion and contraction properties.

What is claimed is:

1. A fiber-reinforced plastic material, wherein said plastic material has a composite structure for cryogenic use comprising first and second fibers as reinforcing materials, said first fiber having a positive thermal expansion coefficient and said second fiber being a polyethylene fiber and having a negative thermal expansion coefficient, and a synthetic resin as a matrix, said plastic material exhibiting an apparent expansion or contraction controlled by any of the variations in the weight ratio, sectional-area ratio, and volume ratio of said first and second fibers, the ratio of longitudinal moduli between said first and second fibers being substantially in reciprocal proportion to the ratio of degree of first fiber expansion or contraction to the degree of second fiber contraction or expansion, and said fiber-reinforced plastic material being in the form of a plate-shaped member which is a laminate of woven fabrics of the first and second fibers, wherein said woven fabrics are stacked one after another with said synthetic resin as a binder, wherein said woven fabrics include a first fabric formed from said first fiber as warps and wefts and a second fabric formed from said second fiber as warps and wefts, said first and second fabrics being alternately stacked after one another, and wherein said first and second fibers are arranged in a substantially uniform distribution within said material, and wherein said material possesses high dimensional stability under cryogenic conditions.

2. A fiber-reinforced plastic material, wherein said plastic material has a composite structure for cryogenic use comprising first and second fibers as reinforcing materials, said first fiber having a positive thermal expansion coefficient and said second fiber being a polyethylene fiber and having a negative thermal expansion coefficient, and a synthetic resin as a matrix, said plastic material exhibiting an apparent expansion or contraction controlled by any of the variations in the weight ratio, sectional-area ratio, and volume ratio of said first and second fibers, the ratio of longitudinal moduli between said first and second fibers being substantially in reciprocal proportion to the ratio of degree of first fiber expansion or contraction to the degree of second fiber contraction or expansion, and said fiber-reinforced plastic material being in the form of a plate-shaped member which is a laminate of woven fabrics of the first and second fibers, wherein said woven fabrics are stacked one after another with said synthetic resin as a binder, and wherein said woven fabrics are formed from said first fiber as warps and from said second fiber as wefts, said woven fabrics being stacked one after another so that the warps of each fabric are oriented perpendicularly to the warps of adjacent fabrics, and the wefts of each fabric are oriented perpendicularly to the wefts of adjacent fabrics, and wherein said first and second fibers are arranged in a substantially uniform distribution within said material, and wherein said material possesses high dimensional stability under cryogenic conditions.

3. A fiber-reinforced plastic material with a composite structure for cryogenic use comprising first and second fibers as reinforcing materials, said first fiber having a positive thermal expansion coefficient and said second fiber being a polyethylene fiber and having a negative thermal expansion coefficient, and a synthetic resin as a matrix, said plastic material exhibiting an apparent expansion or contraction controlled by any of the variations in the weight ratio, sectional-area ratio, and volume ratio of said first and second fibers, the ratio of longitudinal moduli between said first and second fibers being substantially in reciprocal proportion to the ratio of degree of first fiber expansion or contraction to the degree of second fiber contraction or expansion, and said fiber-reinforced plastic material being in the form of a tube-shaped member, wherein said first and second fibers are coated with said synthetic resin and the coated first and second fibers in the same number are alternately wound in a cylindrical shape, or being in the from of a bar-shaped member, wherein said first and second fibers are integrated with each other and bound together in a matrix of the synthetic resin so that said first and second fibers have the same sectional area, and wherein said first and second fibers are arranged in a substantially uniform distribution within said material, and wherein said material possesses high dimensional stability under cryogenic conditions.

4. A fiber-reinforced plastic material according to claim 3, wherein said first fiber is at least one made of a material from the group consisting of glass, alumina, silica, zirconia, silicon carbide, titania, aluminum, and steel.

5. A fiber-reinforced plastic material according to claim 4, wherein said first fiber is a glass fiber.

6. A fiber-reinforced plastic material according to claim 3, wherein said matrix is at least one resin selected from the group consisting of epoxy resins, unsaturated polyester resins, vinyl ester resins, urethane resins, and urethane acrylate resins.

7. A fiber-reinforced plastic material according to claim 6, wherein said matrix is an epoxy resin.

8. A fiber-reinforced plastic material according to claim 3, in the form of a plate-shaped member, wherein said woven fabrics are formed from said first fiber as alternate warps, and from said second fiber as wefts and alternate warps, said woven fabrics being stacked one after another so that the warps of each fabric are oriented perpendicularly to the warps of adjacent fabrics, and the wefts of each fabric are oriented perpendicularly to the wefts of adjacent fabrics.

* * * * *